US012547107B2

(12) United States Patent
Fujisaki

(10) Patent No.: US 12,547,107 B2
(45) Date of Patent: Feb. 10, 2026

(54) IMAGE FORMING APPARATUS AND IMAGE FORMING METHOD

(71) Applicant: SHARP KABUSHIKI KAISHA, Sakai (JP)

(72) Inventor: Tatsuya Fujisaki, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 18/676,716

(22) Filed: May 29, 2024

(65) Prior Publication Data

US 2024/0402637 A1 Dec. 5, 2024

(30) Foreign Application Priority Data

Jun. 1, 2023 (JP) ................................ 2023-090995

(51) Int. Cl.
*G03G 15/23* (2006.01)
*G03G 15/00* (2006.01)

(52) U.S. Cl.
CPC ........... *G03G 15/234* (2013.01); *G03G 15/50* (2013.01); *G03G 15/6555* (2013.01); *G03G 15/6582* (2013.01)

(58) Field of Classification Search
CPC ........... G03G 15/6582; G03G 15/6555; G03G 15/50; G03G 15/234
See application file for complete search history.

(56) References Cited

U.S. PATENT DOCUMENTS

2007/0146776 A1* 6/2007 Suzuki ............... H04N 1/00347 358/1.15
2009/0072468 A1* 3/2009 Ueda .................. G03G 15/6573 271/9.05

(Continued)

FOREIGN PATENT DOCUMENTS

JP 2012-061708 A 3/2012

*Primary Examiner* — David H Banh
(74) *Attorney, Agent, or Firm* — ScienBiziP, P.C.

(57) ABSTRACT

An image forming apparatus comprises a sheet feeding mechanism that feeds a print sheet; an image forming mechanism capable of forming a first image on one surface of the print sheet and allowing the print sheet to pass through the image forming mechanism, and forming a second image on the other surface of the print sheet when the print sheet that has passed through the image forming mechanism is switched back and passes through the image forming mechanism again; a double-sided transport mechanism that switches back the print sheet on which the first image is formed, and guides the print sheet to the image forming mechanism again; a post-processing unit mounter on which a post-processing unit that performs post-processing on a leading end or a trailing end of a print sheet to be discharged can be mounted; and one or more controllers that control a print job, wherein when executing a print job in which at least a part of print sheets is an index sheet, and a post-processing function is set, the one or more controllers determine whether post-processing is to be performed, the order of an image to be formed, and whether to switch back a print sheet by using the double-sided transport mechanism according to a type of the mounted post-processing unit as to whether post-processing is to be performed on a leading end or a trailing end of the print sheet.

8 Claims, 8 Drawing Sheets

(56) References Cited

U.S. PATENT DOCUMENTS

| | | | | |
|---|---|---|---|---|
| 2010/0014115 | A1* | 1/2010 | Sato | G06F 3/1264 358/1.15 |
| 2013/0265606 | A1* | 10/2013 | Tsuya | H04N 1/00482 358/1.15 |
| 2016/0080600 | A1* | 3/2016 | Nishida | H04N 1/00063 358/1.14 |
| 2022/0106149 | A1* | 4/2022 | Komazawa | G03G 15/6508 |
| 2023/0017154 | A1* | 1/2023 | Inui | B65H 7/10 |

* cited by examiner

IMAGE FORMING APPARATUS AND IMAGE FORMING METHOD

CROSS-REFERENCE TO RELATED APPLICATION

The present application claims priority from Japanese Application JP2023-090995, the content to which is hereby incorporated by reference into this application.

BACKGROUND OF THE INVENTION

1. Field of the Invention

The present disclosure relates to an image forming apparatus and an image forming method that perform a print job in which at least a part of print sheets is an index sheet, and post-processing is set.

2. Description of the Background Art

There is known an index sheet including an index portion which has a substantially rectangular shape, and in which a part of one side thereof protrudes outward. When printing is performed for the index sheet, there is a possibility that a leading end position of the print sheet cannot be accurately detected due to the protruding index portion. For this reason, printing is generally performed by setting the index sheet on a sheet feed tray in such a way that the index portion is located on a trailing end side in a transport direction. Meanwhile, there is known an image forming apparatus to which a post-processing unit can be mounted in order to provide, for example, processing of forming a punch hole, as post-processing pertaining to finishing of a print job. In many cases, a post-processing unit can be mounted as an option instead of standard equipment. Among the post-processing units, there are units that perform post-processing on a leading end of a print sheet (for example, form a punch hole), and units that perform post-processing on a trailing end of a print sheet. In the case of post-processing as described above, it is necessary to align an orientation of a printed image with a position where post-processing is performed.

Concerning a relationship between a print job in which print sheets include an index sheet, and an image to be formed, there is known an image forming apparatus capable of outputting a sheet bundle in a state in which a tab is attached in order from the top of the sheet bundle, even when the sheet bundle is output by reusing an unnecessary tab sheet (index sheet). The image forming apparatus includes a tab sheet tray in which tab sheets are set, and an output sheet tray in which output sheets having no tab are set. The image forming apparatus also includes a storage that stores tab sheet information related to a set state of a tab sheet set in the tab sheet tray, and a controller. The controller sets an image forming order, on/off of rotation processing, and on/off of inverted output of a tab sheet, based on tab sheet information stored in the storage, a binding position of a sheet bundle specified by a user, and the number of tab sheets, and controls output of a sheet bundle in which tab sheets and an output purpose co-exist.

SUMMARY OF THE INVENTION

Generally, there are two types of post-processing units, that is, a post-processing unit that performs post-processing on a leading end of a print sheet (for example, form a punch hole), and a post-processing unit that performs post-processing on a trailing end of a print sheet. When a post-processing unit that performs post-processing on a trailing end is mounted, it is reasonable to form a punch hole on the trailing end, if an index portion of an index sheet is located on a leading end side in the transport direction. However, it is unreasonable to form a punch hole on the trailing end, despite that an index portion is located on a trailing end side in the transport direction. In this case, a post-processing function cannot be provided as a print job. However, some image forming apparatuses include a reverse discharge mechanism that reverses the front and back of a printed sheet by a switchback operation, and transports the sheet to a post-processing device. However, some image forming apparatuses do not include a reverse discharge mechanism. In the case of an image forming apparatus including a reverse discharge mechanism, post-processing such as punching by a post-processing device can be performed by switching whether to reverse a print sheet. However, an image forming apparatus that does not include a reverse discharge mechanism needs to switch back an index sheet in some way.

The present disclosure has been made in view of the above circumstances, and an object of the present disclosure is to make it possible to switch back an index sheet, and align an index portion with a position where post-processing is performed without including a dedicated reverse discharge mechanism.

The present disclosure provides an image forming apparatus including: a sheet feeding mechanism that feeds a print sheet; an image forming mechanism capable of forming a first image on one surface of the print sheet and allowing the print sheet to pass through the image forming mechanism, and forming a second image on the other surface of the print sheet when the print sheet that has passed through the image forming mechanism is switched back and passes through the image forming mechanism again; a double-sided transport mechanism that switches back the print sheet on which the first image is formed, and guides the print sheet to the image forming mechanism again; a post-processing unit mounter on which a post-processing unit that performs post-processing on a leading end or a trailing end of a print sheet to be discharged can be mounted; and one or more controllers that control a print job. When executing a print job in which at least a part of print sheets is an index sheet, and a post-processing function is set, the one or more controllers determine whether post-processing is to be performed, the order of an image to be formed, and whether to switch back a print sheet by using the double-sided transport mechanism according to a type of the mounted post-processing unit as to whether post-processing is to be performed on a leading end or a trailing end of the print sheet.

In addition, the present disclosure according to another aspect provides an image forming method including, by one or more controllers that control a print job: feeding a print sheet by using a sheet feeding mechanism; forming a first image on one surface of the print sheet, and allowing the print sheet to pass through an image forming mechanism by using the image forming mechanism; switching back the print sheet on which the first image is formed, and determining whether to guide the print sheet to the image forming mechanism again by using a double-sided transport mechanism; when the print sheet is guided to the image forming mechanism again, forming or not forming a second image on the other surface of the print sheet, and allowing the print sheet to pass and discharging the print sheet by using the image forming mechanism; and performing post-processing on a leading end or a trailing end of the print sheet by using a post-processing unit. When a print job in which at least a part of print sheets is an index sheet, and post-processing is set is executed, the order of an image to be formed, and whether to switch back a print sheet by the double-sided transport mechanism are determined according to a type of the post-processing unit as to whether to perform post-processing on a leading end or a trailing end of the print sheet.

In an image forming apparatus according to the present disclosure, since one or more controllers determine whether post-processing is to be performed, the order of an image to be formed, and whether to switch back a print sheet by using the double-sided transport mechanism according to a type of the mounted post-processing unit as to whether to perform post-processing to a leading end or a trailing end of the print sheet, it is possible to switch back an index sheet, and align an index portion with a position where post-processing is performed without including a dedicated reverse discharge mechanism.

The image forming method according to the present disclosure also provides the same advantageous effect.

DETAILED DESCRIPTION OF THE INVENTION

In the following, the present disclosure is described in more detail with reference to the drawings. Note that, the following description is illustrative in all respects, and should not be construed to limit the present disclosure.

Embodiment 1

Configuration of Image Forming Apparatus

First, an image forming apparatus according to the present embodiment is described.

Figure 1:
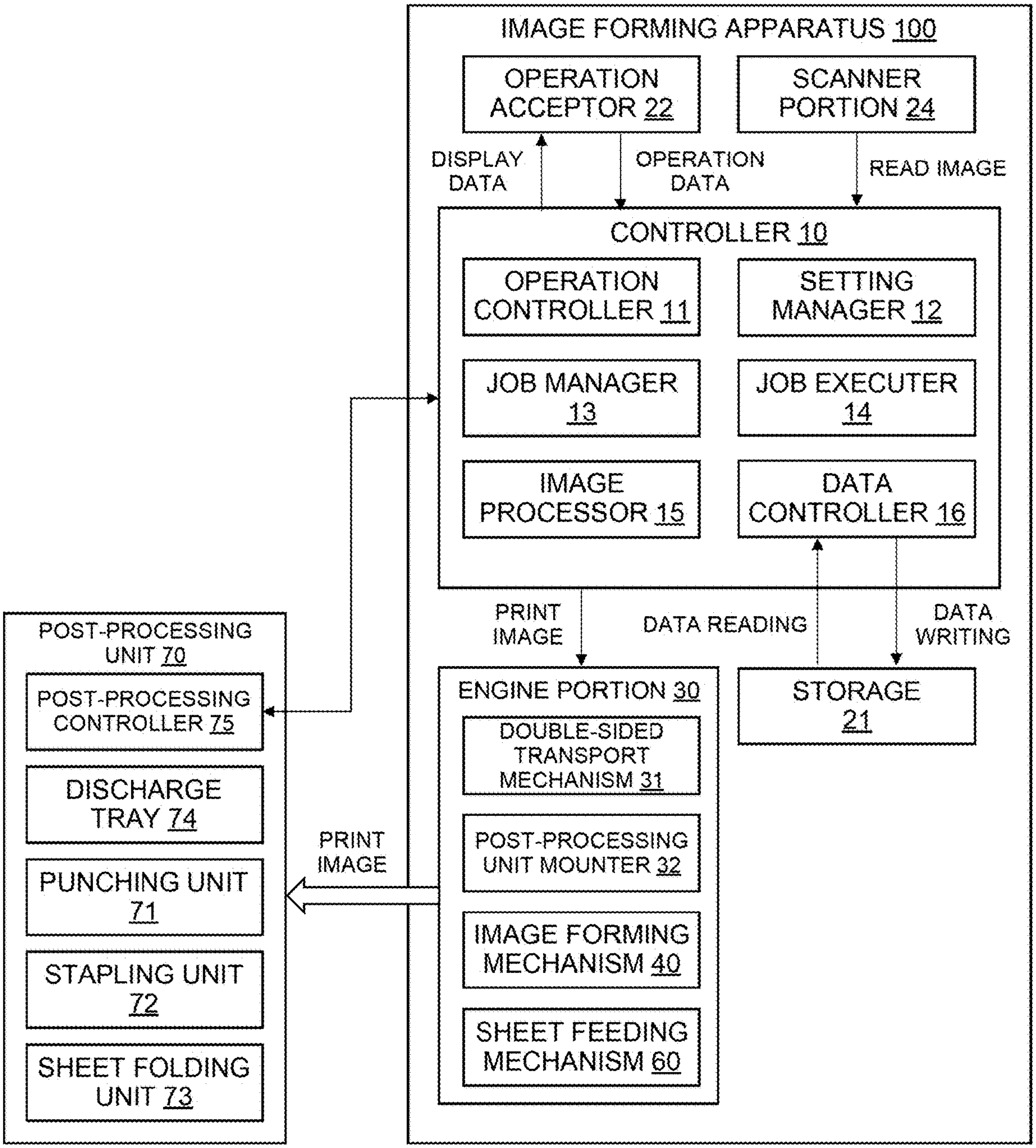
FIG. 1 is a block diagram illustrating a configuration example of a multifunction peripheral, as an example of an image forming apparatus according to an embodiment of the present disclosure.

FIG. 1 is a block diagram illustrating a configuration example of a multifunction peripheral, as an example of an image forming apparatus according to the present embodiment. As illustrated in the block diagram in FIG. 1, an image forming apparatus 100 includes one or more controllers 10, a storage 21, an operation acceptor 22, a scanner portion 24, and an engine portion 30 that forms an image. The one or more controllers 10 include an operation controller 11, a setting manager 12, a job manager 13, a job executer 14, an image processor 15, and a data controller 16. The one or more controllers 10 perform control of the image forming apparatus 100. The one or more controllers 10 further perform control of an image forming system including a post-processing unit 70.

The operation acceptor 22 includes a display device such as, for example, a liquid crystal display, and displays a screen in accordance with control of the operation controller 11. The operation acceptor 22 also includes an operation input device such as a touch panel. The operation input device detects a user operation with respect to the operation acceptor 22, and transmits operation data to the operation controller 11. The operation controller 11 receives the operation data to be detected by the operation input device, and recognizes the user operation. The data controller 16 controls storing and reading of data to and from the storage 21.

The setting manager 12 manages settings on a job to be performed by a user operation or the like. The job manager 13 performs processing of registration, deletion, and suspension of various jobs, such as a copy job, a scanner job, or a print job. When a job registered in the job manager becomes ready for execution, the job manager 13 requests the job executer 14 to start executing the job. The job executer 14 determines whether to start executing a job registered by the job manager 13, or causes the scanner portion 24, the engine portion 30, and the image processor 15 to execute a job according to settings. The job executer 14 also recognizes a state detected by an unillustrated sensor disposed in the scanner portion 24 and the engine portion 30. Further, the job executer 14 controls an operation of an unillustrated motor, actuator, device, and the like disposed in the scanner portion 24 and the engine portion 30. Further, the image processor 15 controls processing pertaining to an image. Further, the image processor 15 performs processing pertaining to a job, such as reading, printing and previewing an image of a document.

The one or more controllers 10, as a specific configuration example, is mainly constituted of a processor. The one or more controllers 10 are constituted of, in addition to a processor, hardware resources such as a work memory, an input/output interface circuit, a timer circuit, an image processing circuit, and a communication circuit. The one or more controllers execute various jobs pertaining to operation recognition, display control, document image reading, image printing, and the like, specifically, a series of pieces of processing pertaining to image formation by causing the processor to execute a control program stored in advance in the storage 21. Functions as the one or more controllers 11 are achieved by cooperation of software resources and hardware resources.

The storage 21 includes a volatile memory such as a DRAM, and a non-volatile memory such as an HDD and a flash memory. The storage 21 stores a control program to be executed by a processor, and image data to be read by the scanner portion 24 and processed by the image processor 15. In addition, the storage 21 stores data pertaining to control of the data controller 16, the job manager 13, the job executer 14, and the image processor 15. The storage 21 may be configured integrally with a memory of the one or more controllers 10.

Figure 2:
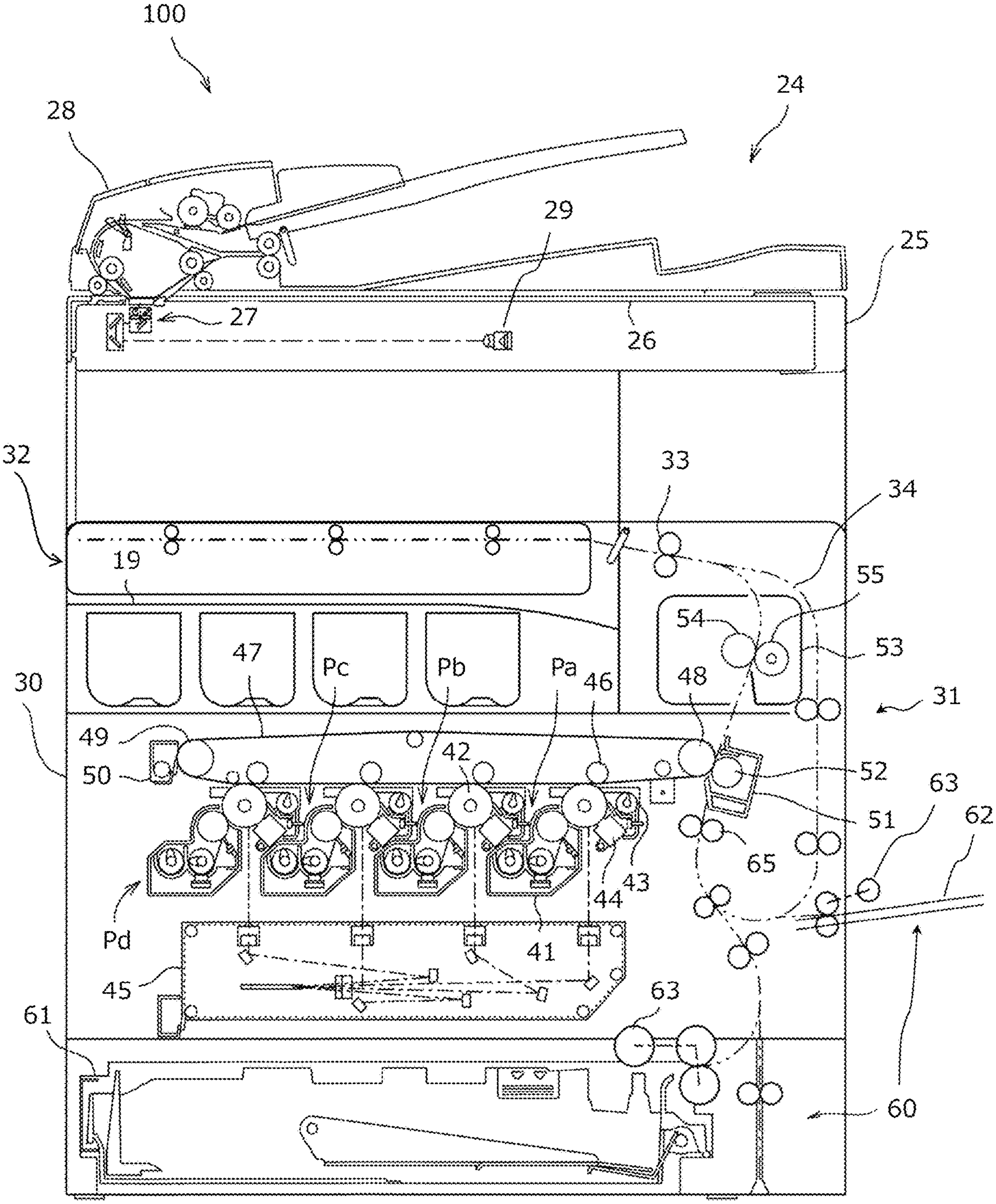
FIG. 2 is a schematic cross-sectional view illustrating a configuration example of a scanner portion and an engine portion of the image forming apparatus illustrated in FIG. 1.

The one or more controllers 10 and the engine portion 30, and the one or more controllers 10 and the scanner portion 24 are respectively connected in such a way that data are transferrable. FIG. 2 is a schematic cross-sectional view illustrating a configuration example of the scanner portion 24 and the engine portion 30 of the image forming apparatus 100 illustrated in FIG. 1. The scanner portion 24 includes an image reader 25 and a document feeding device 28. The document feeding device 28 is disposed on the upper side of the image reader 25, and is openably supported with respect to a document table 26 disposed on a top surface of the image reader 25. The document feeding device 28 transports one or a plurality of documents one by one in order. The scanner portion 24 reads a document to be transported by the document feeding device 28 one by one by the image sensor 29. Further, the scanner portion 24 includes a scanning optical system 27. The scanning optical system 27 scans the document table 26, and reads a document by the image sensor 29. Then, the scanning optical system 27 generates image data of the read document.

The engine portion 30 includes a sheet feeding mechanism 60, an image forming mechanism 40, a double-sided transport mechanism 31, and a post-processing unit mounter 32. The sheet feeding mechanism 60 accommodates print sheets, and feeds a print sheet for use in a print job. For example, in the case of printing by an electrophotographic method, the image forming mechanism 40 performs printing by forming a visible image by toner and transferring onto a print sheet for fixation. Further, for example, in the case of printing by an ink jet method, the image forming mechanism 40 performs printing by forming a visible image by ink on a print sheet. The double-sided transport mechanism 31 switches back a print sheet on which an image is printed, and guides the print sheet to the image forming mechanism again via a reverse transport path 34.

The image forming mechanism 40 forms a color image using colors of black (K), cyan (C), magenta (M), and yellow (Y), or a monochromatic image using a single color (e.g., black). The image forming mechanism 40 is provided with a developing device 41, a photosensitive drum 42, a drum cleaning device 43, and a charger 44 for forming a toner image of four types, each of which is provided by four and associated with black, cyan, magenta, and yellow. Thus, four image stations Pa, Pb, Pc, and Pd are configured. Further, the image forming mechanism 40 includes an optical scanning device 45 that forms an electrostatic latent image by exposing a surface of the photosensitive drum 42 with light.

The developing device 41 develops an electrostatic latent image on the surface of the photosensitive drum 42, and forms a toner image on the surface of the photosensitive drum 42. The drum cleaning device 43 removes and collects residual toner on the surface of the photosensitive drum 42. The charger 44 uniformly charges the surface of the photosensitive drum 42 with a predetermined electric potential. By the above-described series of operations, a toner image of each color is formed on the surface of each photosensitive drum 42.

Further, the image forming mechanism 40 includes an intermediate transfer roller 46, an endless intermediate transfer belt 47, an intermediate belt drive roller 48, an intermediate belt driven roller 49, and a belt cleaning device 50. The intermediate transfer roller 46 is provided inside the intermediate transfer belt 47 each by four in such a way as to form a toner image of four types according to each color. The intermediate transfer roller 46 transfers a toner image of each color formed on the surface of the photosensitive drum 42 onto the intermediate transfer belt 47 that moves in a circulating manner. The intermediate transfer belt 47 is stretched between the intermediate belt drive roller 48 and the intermediate belt driven roller 49. In the image forming apparatus 100, a color toner image is formed on the surface of the intermediate transfer belt 47 by sequentially transferring and superimposing a toner image of each color formed on the surface of each photosensitive drum 42. The belt cleaning device 50 removes and collects waste toner that remains on the surface of the intermediate transfer belt 47 without being transferred onto a print sheet.

Furthermore, the image forming mechanism 40 includes a secondary transfer device 51 and a fixing device 53. The secondary transfer device 51 includes a secondary transfer roller 52, and sandwiches a print sheet transported from the sheet feeding mechanism 60 at a transfer nip portion between the secondary transfer roller 52 and the intermediate transfer belt 47, and then transports the print sheet. When passing through the transfer nip portion, the print sheet has a toner image on the surface of the intermediate transfer belt 47 being transferred, and is transported to the fixing device 53 disposed above the secondary transfer device 51. The fixing device 53 includes, as a rotation fixing member, a fixing roller 54 that rotates around an axis, and a pressing roller 55. The fixing device 53 heats and presses the print sheet to be transported from the transfer nip portion between the fixing roller 54 and the pressing roller 55, and fixes the toner image on the print sheet.

The sheet feeding mechanism 60 includes a sheet feed tray 61, a manual feed tray 62, a sheet feeding roller 63, a manual sheet feeding roller 64, and registration rollers 65. The sheet feeding mechanism 60 feeds print sheets one by one from the sheet feed tray 61 in which print sheets are accommodated by the sheet feeding roller 63, transports the print sheet to the registration rollers 65, and transports the print sheet to the transfer nip portion in such a way as to synchronize an image on the intermediate transfer belt 47 with a position on the print sheet. Likewise, the sheet feeding mechanism 60 feeds print sheets placed on the manual feed tray 62 one by one, transports to the registration rollers 65, and transports the print sheet to the transfer nip portion. In case of performing printing, an image is transferred to the print sheet at the transfer nip portion. In the present disclosure, it is assumed that the setting manager 12 accepts settings on each of a type of a print sheet to be accommodated in the sheet feed tray 61, and a type (sheet type) of a print sheet to be placed on the manual feed tray 62. It is assumed that there is an index sheet, as one of settable sheet types. When a print job in which print sheets include an index sheet is executed, a user places the index sheet on a predetermined tray (e.g., a manual feed tray), and sets a sheet type for the manual feed tray to the index sheet by using the operation acceptor 22.

The double-sided transport mechanism 31 includes a discharge roller 33 and the reverse transport path 34. When a trailing end of a print sheet that has passed through the transfer nip portion and the fixing device 53 reaches a position immediately before the discharge roller 33, the one or more controllers 10 as the job executer 14 switch back the print sheet, that is, transport the print sheet in the opposite direction and guide the print sheet to the reverse transport path 34. The print sheet that has passed through the reverse transport path 34 is guided again to the registration rollers 65 in a state where the front and back sides are reversed. The one or more controllers 10 as the job executer 14 transport the print sheet that has been guided to the registration rollers 65 to the transfer nip portion and the fixing device 53 again. In a case where double-sided printing is performed, an image is transferred when the sheet passes through the transfer nip portion. Then, the print sheet is transported to a left end of the engine portion 30 through the fixing device 53 and the discharge roller 33. The post-processing unit mounter 32 is provided at a left end of the engine portion 30. The post-processing unit mounter 32 is a portion that positions the post-processing unit 70 which can be mounted on the left side of the engine portion 30, and discharges the print sheet from the engine portion 30 to the mounted post-processing unit 70. For example, a positioning pin may be provided in the post-processing unit 70, and a hole into which the pin is inserted may be provided in the post-processing unit mounter 32. In addition, an opening portion for discharging a print sheet may be provided.

The post-processing unit 70 to be mounted on a left end of the engine portion 30 may include, as post-processing, a punching unit 71 that forms a punch hole on a print sheet, a stapling unit 72 that staples, and a sheet folding unit 73 that folds a sheet (see FIG. 1). The punching unit 71 forms a punch hole on either a leading end or a trailing end of a print sheet to be transported to the post-processing unit 70. The stapling unit 72 staples either a leading end or a trailing end of a print sheet. The sheet folding unit 73 performs sheet folding (e.g., Z-folding) with respect to either a leading end or a trailing end of a print sheet as a reference. It is assumed that a reference for a post-processing position in the post-processing unit is unified to either a leading end side or a trailing end side. That is, when the punching unit 71 is based on a leading end reference, it is assumed that the stapling unit 72 and the sheet folding unit are also based on the leading end reference. When the punching unit 71 is based on the trailing end reference, it is assumed that the stapling unit 72 and the sheet folding unit are also based on the trailing end reference. Further, the post-processing unit 70 includes a discharge tray 74 to which the post-processed print sheet is discharged, and a post-processing controller 75 that controls an operation of post-processing by communicating with the one or more controllers 10.

Print Job Including Index Sheet, and Post-Processing

Figure 3:
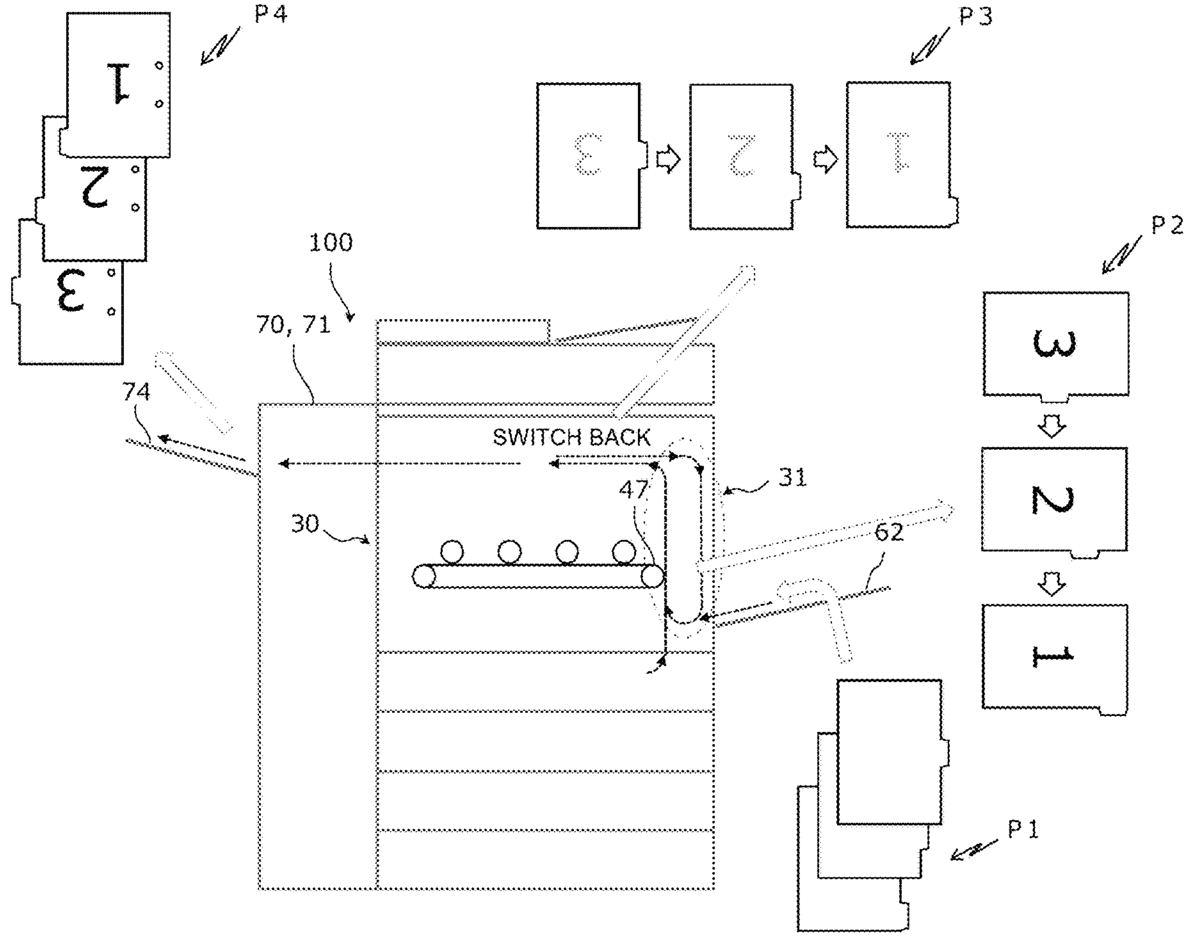
FIG. 3 is an explanatory diagram illustrating an example in which the image forming apparatus illustrated in FIGS. 1 and 2 performs a print job in which a print sheet is an index sheet, and punching is set (punching based on a trailing end reference).

Processing when the image forming apparatus 100 illustrated in FIGS. 1 and 2 performs a print job in which at least a part of print sheets is an index sheet, and post-processing is set is described. FIG. 3 is an explanatory diagram illustrating an example in which the image forming apparatus 100 executes a print job in which a print sheet is an index sheet, and punching is set as post-processing. Punching is preferable post-processing as an embodiment of the present disclosure in a point that a finished state is the same on both of the front and the back.

The print job illustrated in FIG. 3 is a job in which all of a plurality of print sheets are index sheets. An index sheet is fed from the sheet feeding mechanism 60 of the image forming apparatus 100 in a state that an index portion is located on a trailing end side. An image is formed on a first surface of each index sheet, an image is not formed on a second surface being the other side, and punching post-processing is performed. The punching unit forms a punch hole on a trailing end of a print sheet. The image forming apparatus 100 includes the punching unit 71 of the trailing end reference and the double-sided transport mechanism 31, but does not include a reverse discharge mechanism. The setting manager of the one or more controllers 10 stores in advance information pertaining to these configurations in the storage 21 in such a way that the information can be referred to. In addition, a transport path of a print sheet and the order of an image to be formed are determined in such a way as to achieve a finished state in which the sheets are arranged in the page order according to a setting content of a print job to be executed, and the configuration of the image forming apparatus 100.

In the example illustrated in FIG. 3, illustration indicated by the reference sign P1 indicates an orientation of an index sheet to be placed on the manual feed tray 62 in a state that the manual feed tray 62 is viewed from above. Further, illustration indicated by the reference sign P2 indicates the order of images to be transferred to an index sheet that passes through the transfer nip portion between the intermediate transfer belt 47 and the secondary transfer roller 52 (not illustrated in FIG. 3), the number indicates the page number, and an image is formed in descending order from a last page to a first page. Illustration of P2 indicates a state when an index sheet is viewed from the side of the intermediate transfer belt 47.

In the example illustrated in FIG. 3, the one or more controllers 10 switch back and guide to the double-sided transport mechanism 31 at a point of time when a trailing end of an index sheet that has passed through the transfer nip portion has reached a position immediately before the discharge roller 33 (not illustrated in FIG. 3), and transports to the post-processing unit 70 after allowing the sheet to pass through the transfer nip portion again. Illustration indicated by the reference sign P3 indicates a state when an index sheet is viewed from above when being switched back. As illustrated by P3, a surface on which a toner image is transferred is a surface facing downward. The front and back are reversed by switch back. Therefore, when an index sheet passes through the double-sided transport mechanism 31, and passes through the discharge roller 33 again, the index portion is located on the leading end side, and the transferred toner image is located on the upper surface of the index sheet. The punching unit 71 forms a punch hole on the trailing end of the index sheet. Illustration indicated by the reference sign P4 indicates a state in which a punch hole is formed, and the index sheet discharged to the discharge tray 74 is viewed from above. The last page is located at the bottommost position, the first page is located at the topmost position, and the transferred image is located on a surface facing upward. The punch hole is formed on a side opposite to the index portion, and a finished state in which the sheets are arranged in the page order is achieved. According to the configuration illustrated in FIG. 3, when the post-processing unit performs post-processing on a trailing end, and the image forming apparatus does not include a reverse discharge mechanism, a print job can be executed in such a way that post-processing is performed, and a finished state in which the sheets are arranged in the page order by forming an image in reverse order of pages and switching back the print sheets by the double-sided transport mechanism.

Figure 4:
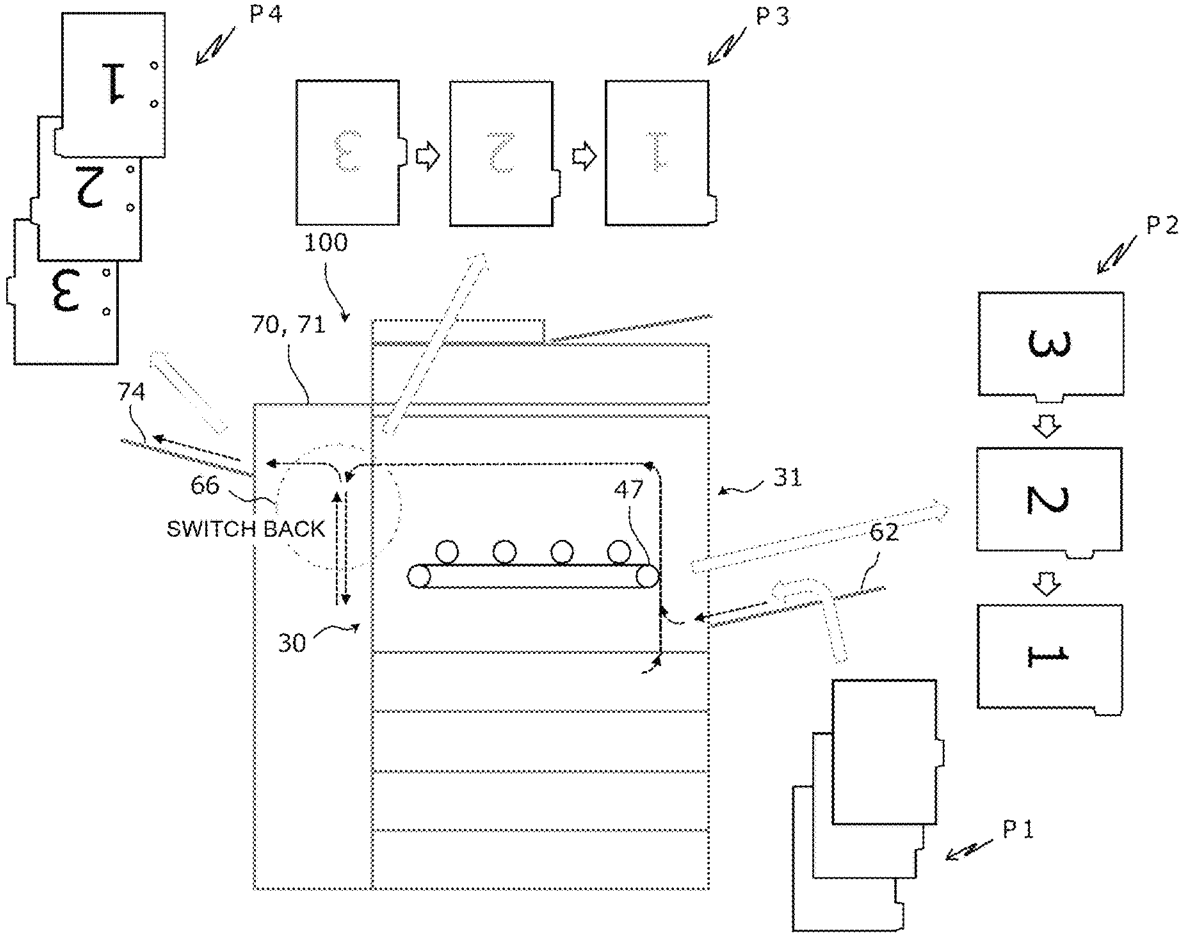
FIG. 4 is an explanatory diagram illustrating an example in which a print job similar to FIG. 3 is executed, when the image forming apparatus includes a reverse discharge mechanism.

FIG. 4 is different from the example illustrated in FIG. 3 in the configuration of the post-processing unit 70. The post-processing unit 70 illustrated in FIG. 4 includes a reverse discharge mechanism 66 on the upstream side of the transport path leading to the punching unit 71. The one or more controllers 10 can guide an index sheet that has passed through the transfer nip portion to the punching unit 71 after the index sheet is switched back by the reverse discharge mechanism 66. When a print job similar to that in the example illustrated in FIG. 3 is executed, the one or more controllers 10 determine the transport path of a print sheet, and the order of an image to be formed in such a way that a finished state in which the sheets are arranged in the page order is achieved according to a setting content of the print job to be executed, and the configuration of the image forming apparatus 100.

In the example illustrated in FIG. 4, the one or more controllers 10 form an image from a last page to a first page, specifically, in descending order, and transport an index sheet that has passed through the transfer nip portion to the post-processing unit 70 without switching back to the double-sided transport mechanism 31. Then, after being switched back by the reverse discharge mechanism 66 of the post-processing unit 70, the index sheet is transported to the punching unit 71. As in the case of FIG. 3, the reference signs P1 to P4 indicate a state in which an index sheet is placed on the manual feed tray 62, a state in which an image is transferred at the transfer nip portion, a state in which the index sheet is switched back by the reverse discharge mechanism 66, and a state in which the index sheet is discharged to the discharge tray 74. The reference sign P3 indicates a state in which the index sheet to be transported to the post-processing unit 70 is viewed from above, that is, a state before the switchback. The index portion is located on the trailing end side before being switched back. The front and the back are reversed by the switchback, and the index portion is located on the leading end side. Therefore, when the index sheet is guided to the punching unit 71, the index portion is located on the leading end side, and the transferred toner image is located on the upper surface of the index sheet. The punching unit 71 forms a punch hole on the trailing end. Illustration indicated by the reference sign P4 is in the same state as in FIG. 3. That is, the last page is located at the bottommost position, the first page is located at the topmost position, and the transferred image is located on the surface facing upward. The punch hole is formed on a side opposite to the index portion, and a finished state in which the sheets are arranged in the page order is achieved. According to the configuration illustrated in FIGS. 3 and 4, when the image forming apparatus 100 is optionally provided with the reverse discharge mechanism 66, the one or more controllers 10 can determine the order of an image to be formed, and whether to switch back by the double-sided transport mechanism 31, or switch back by the reverse discharge mechanism 66, when an index sheet is switched back according to presence or absence of the reverse discharge mechanism 66.

Figure 5:
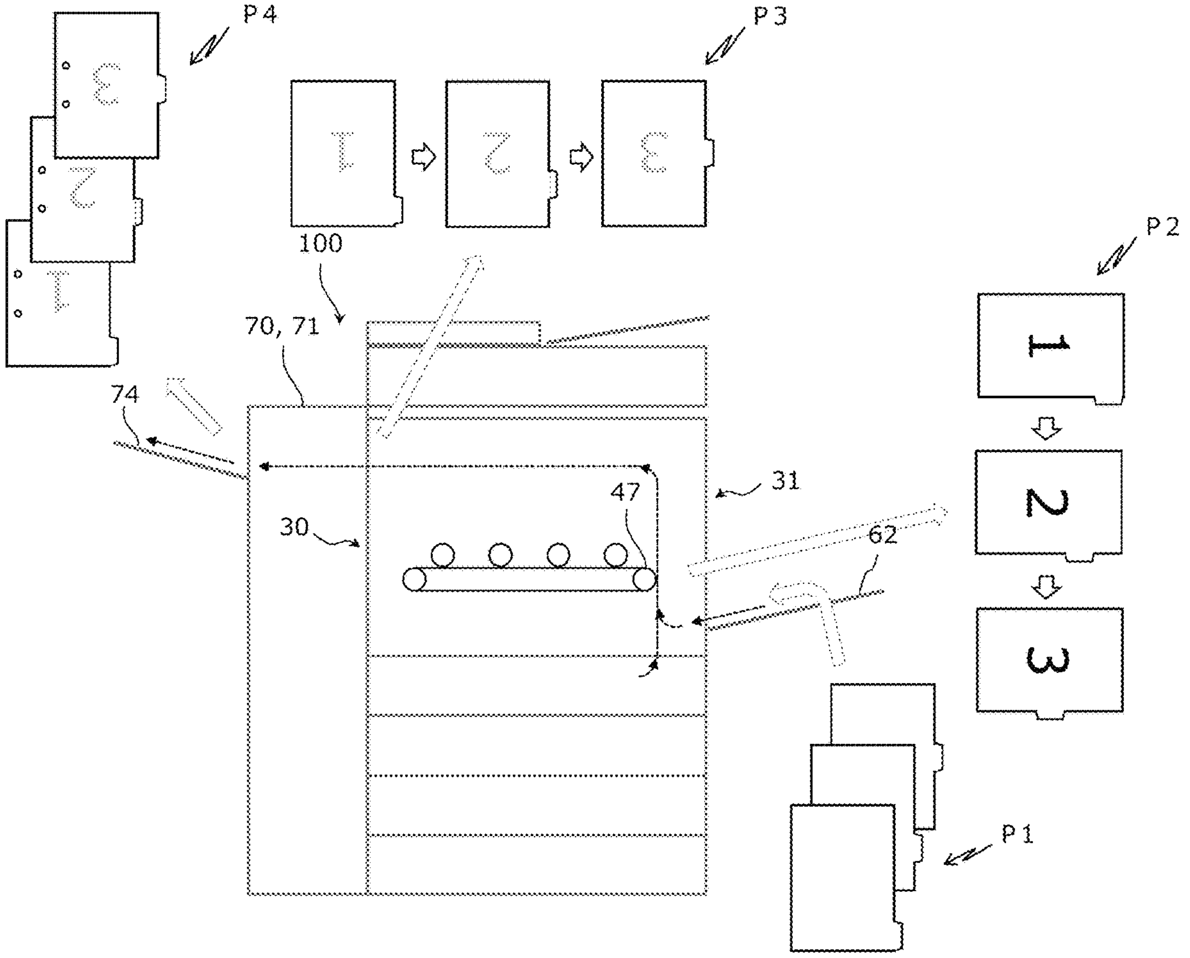
FIG. 5 is an explanatory diagram illustrating an example in which a print job similar to FIG. 3 is executed, when a punching unit is based on a leading end reference.

FIG. 5 is different from the example illustrated in FIGS. 3 and 4 in the configuration of the post-processing unit 70. The post-processing unit 70 illustrated in FIG. 5 is not provided with the reverse discharge mechanism 66, and the punching unit 71 forms a punch hole on a leading end.

In the example illustrated in FIG. 5, the one or more controllers 10 form an image in the page order, that is, in ascending order, transport an index sheet that has passed through the transfer nip portion to the post-processing unit 70 without switching back to the double-sided transport mechanism 31, form a punch hole on a leading end of the index sheet by using the punching unit 71, and discharges to the discharge tray 74. As in the case of FIGS. 3 and 4, the reference signs P1 to P4 indicate a state in which an index sheet is placed on the manual feed tray 62, a state in which an image is transferred at the transfer nip portion, a state in which the index sheet is switched back by the reverse discharge mechanism 66, and a state in which the index sheet is discharged to the discharge tray 74. The reference sign P3 indicates a state in which the index sheet to be transported to the post-processing unit 70 is viewed from above. When the index sheet is guided to the punching unit 71, the index portion is located on the trailing end side, and the transferred toner image is located on the lower surface of the index sheet. The punching unit 71 forms a punch hole on the leading end. As indicated by illustration of the reference sign P4, regarding the index sheets discharged to the discharge tray 74, the first page is located at the bottommost position, the last page is located at the topmost position, and the transferred image is located on the surface facing downward. The punch hole is formed on a side opposite to the index portion, and a finished state in which the sheets arranged in the page order is achieved. According to the configuration illustrated in FIGS. 3 to 5, the one or more controllers 10 can determine the order of an image to be formed, and whether to switch back the index sheet depending on whether the punching unit 71 is based on the leading end reference or the trailing end reference.

Figure 6:
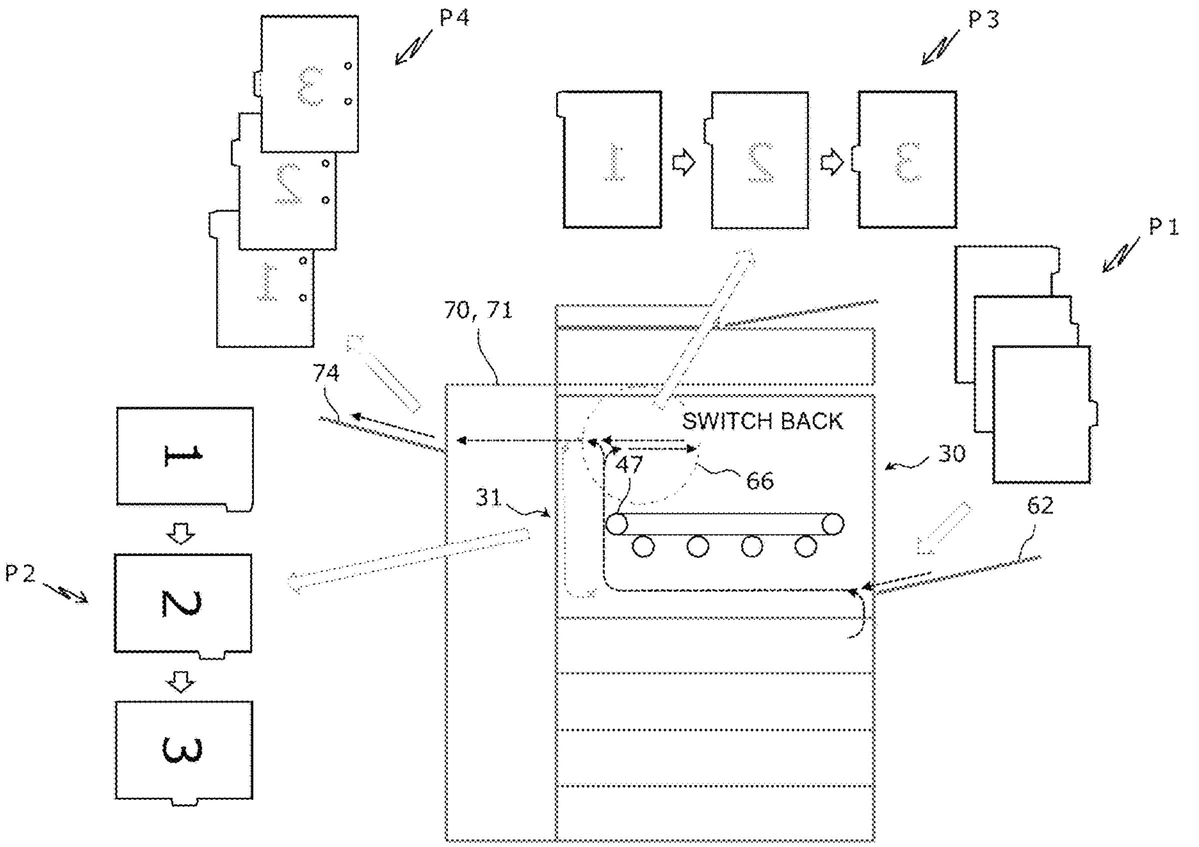
FIG. 6 is an explanatory diagram illustrating an example in which a print job similar to FIG. 3 is executed by an image forming apparatus including a configuration of a sheet transport path different from that in FIG. 3, the image forming apparatus including a reverse discharge mechanism (punching based on the trailing end reference).
Figure 7:
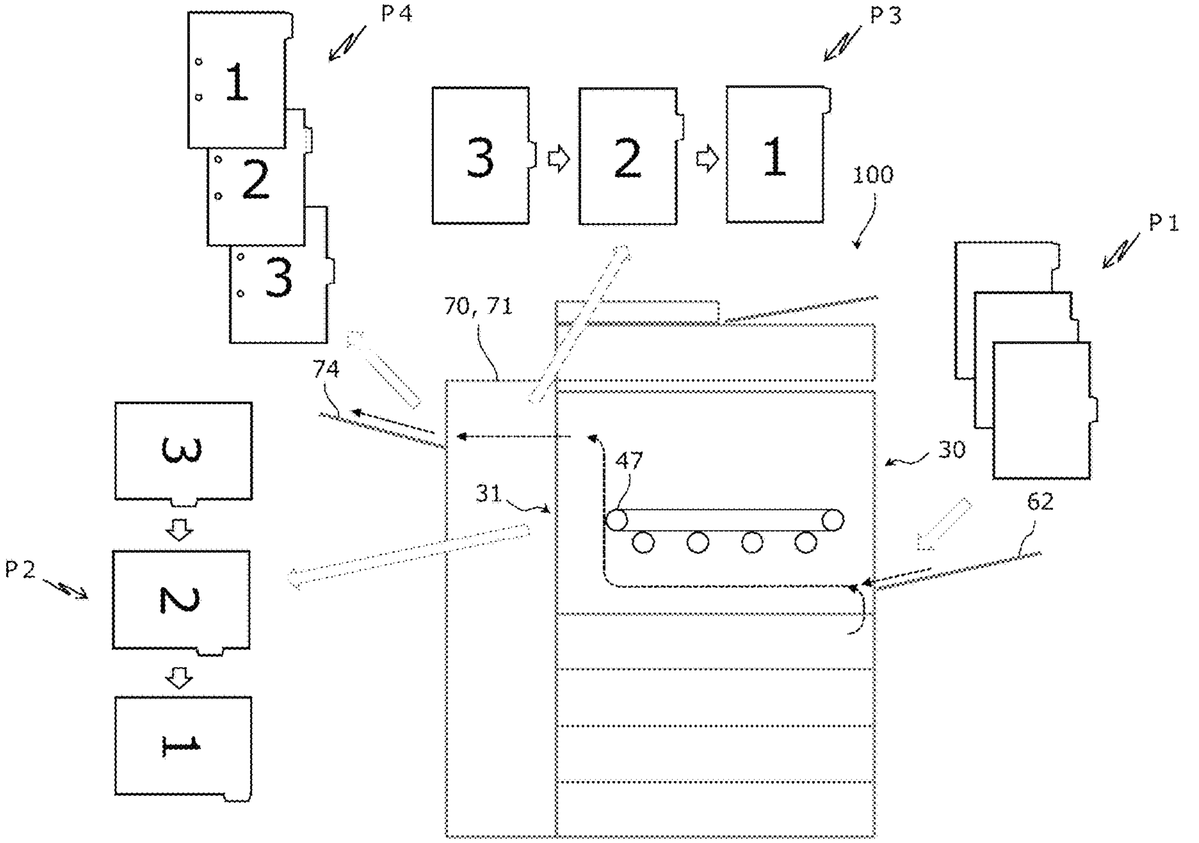
FIG. 7 is an explanatory diagram illustrating an example in which a print job similar to FIG. 6 is executed, when a punching unit is based on a leading end reference.

In FIGS. 6 and 7, the configuration of the sheet transport path of the image forming apparatus 100 is different from the example illustrated in FIGS. 3 to 5. In the image forming apparatus 100 illustrated in FIGS. 6 and 7, a toner image is transferred after a fed index sheet is transported to the left end of the intermediate transfer belt 47 in the transport path below the intermediate transfer belt 47. That is, the transfer nip portion is located on the left end of the intermediate transfer belt 47. The double-sided transport mechanism 31 is located on the further left side of the transfer nip portion. A portion for switching back the index sheet that has passed through the transfer nip portion is located above the transfer nip portion, and guides the index sheet to the double-sided transport mechanism 31 on the left side by reversing the transport direction after guiding the index sheet to the switchback path on the right side. Since the transport direction of the index sheet after the switchback is a direction toward the post-processing unit 70, it is also easy to enable to switch the transport path in such a way as to guide the index sheet to the post-processing unit 70, in place of guiding the index sheet to the double-sided transport mechanism 31. In other words, when the image forming apparatus 100 includes the sheet transport path as illustrated in FIGS. 6 and 7, it is easy to provide the reverse discharge mechanism 66. FIG. 6 illustrates a configuration in which the image forming apparatus 100 includes the reverse discharge mechanism 66. Further, in FIG. 6, it is assumed that the punching unit 71 forms a punch hole on the trailing end.

In the example illustrated in FIG. 6, the one or more controllers 10 form an image in the page order, that is, in ascending order, switch back an index sheet that has passed through the transfer nip portion by the reverse discharge mechanism 66, without guiding the index sheet to the double-sided transport mechanism 31, and transport to the post-processing unit 70. Then, a punch hole is formed on the trailing end of the index sheet by using the punching unit 71, and the index sheet is discharged to the discharge tray 74. As in the case of FIGS. 3 to 5, the reference signs P1, P2, and P4 indicate a state in which an index sheet is placed on the manual feed tray 62, a state in which an image is transferred at the transfer nip portion, a state in which the index sheet is switched back by the reverse discharge mechanism 66, and a state in which the index sheet is discharged to the discharge tray 74. The reference sign P3 indicates a state in which an index sheet to be guided to the punching unit 71 after switchback is viewed from above. When the index sheet is guided to the punching unit 71, the index portion is located on the leading end side, and the transferred toner image is located on the lower surface of the index sheet. The punching unit 71 forms a punch hole on the trailing end. As indicated by illustration of the reference sign P4, regarding the index sheets discharged to the discharge tray 74, the first page is located at the bottommost position, the last page is located at the topmost position, and the transferred image is located on the surface facing downward. The punch hole is formed on a side opposite to the index portion, and a finished state in which the sheets are arranged in the page order is achieved.

FIG. 7 is different from the example illustrated in FIG. 6 in the configuration of the post-processing unit 70, and the punching unit 71 forms a punch hole on the leading end. In the example illustrated in FIG. 7, the one or more controllers 10 form an image in reverse order of pages, that is, in descending order, and transport an index sheet that has passed through the transfer nip portion to the post-processing unit 70. Then, a punch hole is formed on the leading end of the index sheet by using the punching unit 71, and the index sheet is discharged to the discharge tray 74. As in the case of FIGS. 3 to 6, the reference signs P1, P2, and P4 indicate a state in which an index sheet is placed on the manual feed tray 62, a state in which an image is transferred at the transfer nip portion, and a state in which the index sheet is discharged to the discharge tray 74. The reference sign P3 indicates a state in which the index sheet to be guided to the punching unit 71 is viewed from above. When the index sheet is guided to the punching unit 71, the index portion is located on the trailing end side, and the transferred toner image is located on the upper surface of the index sheet. The punching unit 71 forms a punch hole on the leading end. As illustrated by illustration of the reference sign P4, regarding the index sheets discharged to the discharge tray 74, the last page is located at the bottommost position, the first page is located at the topmost position, and the transferred image is located on the surface facing upward. The punch hole is formed on a side opposite to the index portion, and a finished state in which the sheets are arranged in the page order is achieved.

As described above, according to the present embodiment, an example has been described in which an index sheet is fed with an index portion being located on a trailing end side, passes through the registration rollers 65 and the transfer nip portion, and is discharged after being switched back by the double-sided transport mechanism 31. When the fed index sheet passes through the transfer nip portion for the first time, the one or more controllers 10 as the job executer 14 transfer a toner image to a first surface of the index sheet according to the settings. However, the one or more controllers 10 as the job executer 14 do not allow transfer of a toner image to a second surface of the index sheet, when the index sheet passes through the registration rollers 65 and the transfer nip portion again after switchback. This is because there is a possibility that position alignment of the toner image and the index sheet may not be performed accurately, because the index sheet passes through the registration rollers 65 with the index portion being located on the leading end side.

Processing to Determine Order of Forming Image and Switchback by Controller

Figure 8:
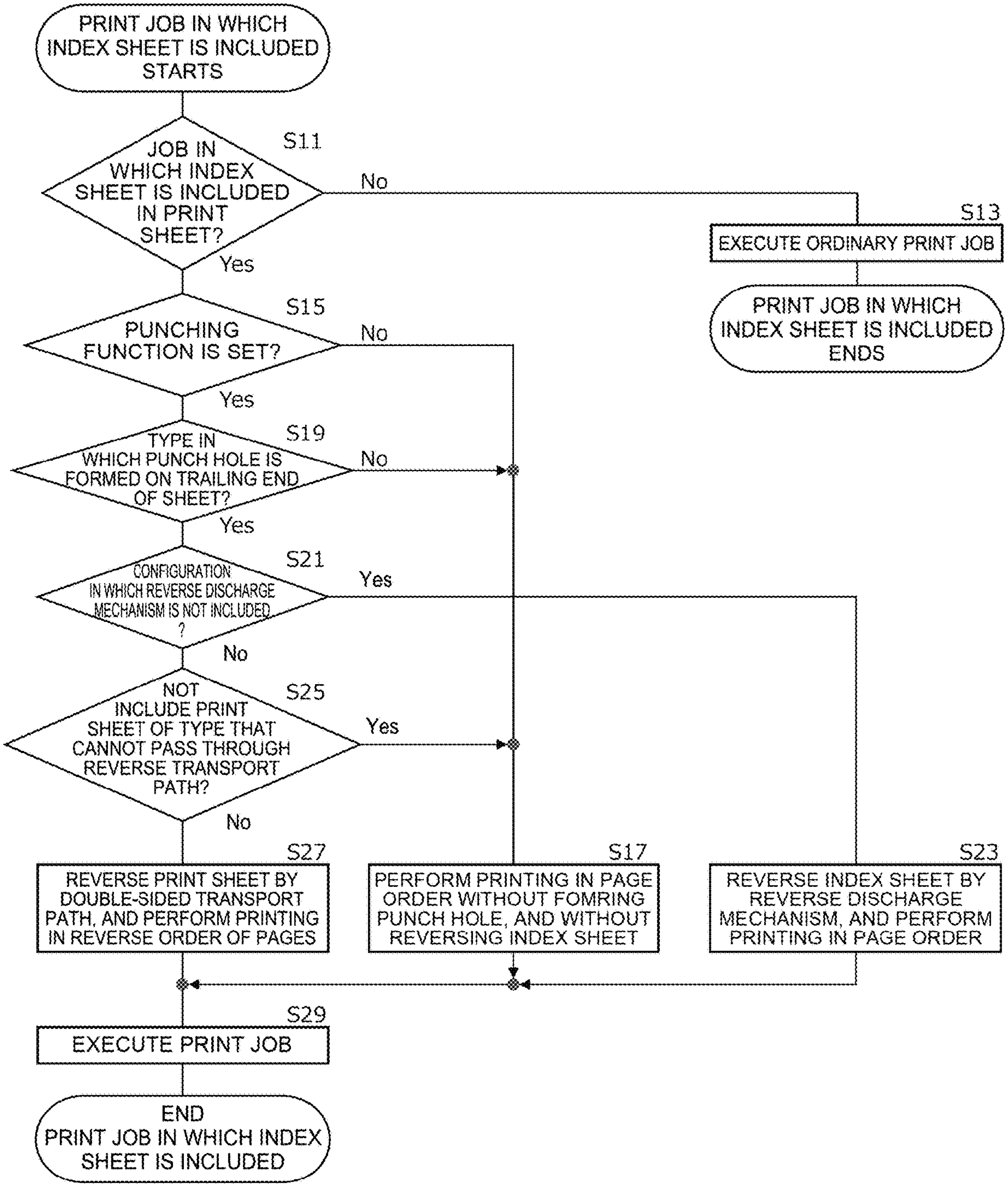
FIG. 8 is a flowchart illustrating an example of processing of determining a transport path, and an image forming order by one or more controllers illustrated in FIG. 1 according to a switchback mechanism and a post-processing position reference.

Next, an example of processing of determining a transport path and the order of forming an image by the one or more controllers 10 is described with reference to a flowchart. FIG. 8 is a flowchart illustrating an example of determining a transport path and the order of image formation by the one or more controllers illustrated in FIG. 1 according to a switchback mechanism and a post-processing position reference. Note that, in the flowchart in FIG. 8, it is assumed that the engine portion 30 includes a transport path having a configuration illustrated in FIGS. 3 to 5. As illustrated in FIG. 8, when accepting an instruction to execute a print job, the one or more controllers 10 as the job executer 14 determine whether at least a part of print sheets includes an index sheet (step S11). When an index sheet is not included (No in step S11), processing pertaining to an ordinary print job is performed (step S13), and the processing is finished.

On the other hand, when print sheets include an index sheet (Yes in step S11), the one or more controllers 10 determine whether the job is a job in which post-processing (punching in the flowchart) is set (step S15). When punching is not set (No in step S15), it is determined to perform printing in the page order without switching back the index sheet (step S17), the print job is executed according to the determination (step S29), and the processing is finished. On the other hand, when punching is set (Yes in step S15), subsequently, the one or more controllers 10 determine whether the post-processing position of the punching unit 71 is based on the trailing end reference or the leading end reference (step S19). When the post-processing position is based on the leading end reference (No in step S19), it is determined to perform printing in the page order without switching back the index sheet (step S17), the print job is executed according to the determination (step S29), and the processing is finished.

On the other hand, when the post-processing position of the punching unit 71 is based on the trailing end reference (Yes in step S19), subsequently, the one or more controllers 10 determine whether the image forming apparatus 100 includes a reverse discharge mechanism (step S21). In a case where the reverse discharge mechanism is included (Yes in step S21), the one or more controllers 10 switch back the index sheet by the reverse discharge mechanism 66, determine to perform printing in the page order (step S23), execute the print job according to the determination (step S29), and finish the processing. When the image forming apparatus 100 does not include the reverse discharge mechanism (No in step S21), subsequently, the one or more controllers 10 determine whether a print sheet other than an index sheet, and of a sheet type that does not pass through the reverse transport path 34 of the double-sided transport mechanism 31 is included (step S25). Note that, it is assumed that an index sheet passes through the double-sided transport mechanism 31. When a print sheet of a sheet type that does not pass through the reverse transport path 34 is included (Yes in step S25), the one or more controllers 10 determine to perform printing in the page order without switching back the index sheet (step S17), execute the print job according to the determination (step S29), and finish the processing.

On the other hand, when a print sheet of a sheet type that does not pass through the reverse transport path 34 is not included (No in step S25), the one or more controllers 10 determine to form an image in reverse order of pages, switch back the print sheet by the double-sided transport mechanism 31 to reverse the front and back of the print sheet, and perform punching post-processing on a trailing end of the print sheet. As described above, the one or more controllers 10 determine the order of image formation, and a sheet transport path that may include switchback.

Embodiment 2

In the embodiment 1, a print job in which all print sheets are index sheets has been described as an example. However, there is also a print job in which print sheets include a print sheet other than an index sheet. For example, there is a print job in which print sheets of a sheet type being plain print sheets are accommodated in the sheet feed tray 61, print sheets of a sheet type being index sheets are accommodated in the manual feed tray 62, and an index sheet is set to be inserted into a predetermined page. Also in a print job as described above, similarly to the embodiment 1, one or more controllers 10 determine a transport path of a print sheet, and the order of image formation according to presence or absence of post-processing, whether a post-processing unit is based on a leading end reference or a trailing end reference, and presence or absence of a reverse discharge mechanism. According to this configuration, even when a print job includes a print sheet other than an index sheet, the print job can be finished in a state in which print sheets are arranged in the page order and post-processing is performed.

Further, as described in the embodiment 1, the one or more controllers 10 do not allow printing on a second surface of an index sheet to be switched back. However, for example, regarding a print sheet other than an index sheet, printing on a second surface may be allowed unless the sheet is of a type that cannot be subjected to double-sided printing, such as thick paper. When a print sheet other than an index sheet is included, and the print sheet is of a type that cannot be transported by using a double-sided transport mechanism, the one or more controllers 10 determine that switchback using the double-sided transport mechanism is not possible. Therefore, in the case of a print job in which switchback should be performed for an index sheet by using the double-sided transport mechanism, the one or more controllers determine that the print job is a print job in which post-processing cannot be performed, when a print sheet of a type that cannot be transported by using the double-sided transport mechanism is included. According to this configuration, in a print job in which an index sheet should be switched back by using a double-sided transport mechanism, when a print sheet other than an index sheet is included, and the print sheet cannot be switched back by the double-sided transport mechanism, the one or more controllers make it impossible to set post-processing, or make it impossible to perform post-processing even when post-processing is set, regardless of presence or absence of double-sided printing. In this way, a transport failure or sheet jam is prevented.

When an index sheet with an index portion being located on a trailing end side passes through the registration rollers 65, the one or more controllers 10 as the job executer 14 maintain a suspended state of the registration rollers 65 at a point of time when a leading end reaches the registration rollers 65. Oblique feed of an index sheet is suppressed by controlling in such a way that the index sheet is transported after creating a sag in the index sheet, and the index sheet is aligned with a toner image. However, after the switchback, when the index sheet with the index portion being located on the leading end side passes through the registration rollers 65, a different control is performed. The index sheet is not suspended by the registration rollers 65. There are a plurality of types of index sheets in which an index portion is formed at a different position in the width direction orthogonal to the transport direction. Even when a sensor for detecting passing of a print sheet is provided at a predetermined position in the width direction to detect a leading end, it is not easy to determine whether the detected portion is the leading end of the index portion or the leading end of a portion other than the index portion. In other words, in a state where the index portion is located on the leading end side, it is not easy to suppress skew feeding using the registration rollers 65, and to align the index portion with a toner image. Therefore, the one or more controllers 10 as the job executer 14 do not suspend transport of an index sheet by the registration rollers 65, and do not allow transfer of a toner image to a second surface of the index sheet. The one or more controllers allow image formation, for example, when it is set in such a way to form an image on a first surface, when an index sheet is fed from a sheet feeding mechanism in a state in which the index portion of the index sheet is located on the trailing end side, but do not allow forming an image on a second surface in a state in which the index portion is located on the leading end side after switchback. According to this configuration, it is possible to prevent misalignment due to inaccurate alignment of an index sheet that passes through an image forming mechanism, and an image in the transport direction.

Embodiment 3

In the embodiment 1, a configuration in which the engine portion 30 includes the double-sided transport mechanism 31 and the sheet feeding mechanism 60, and the punching unit 71, the stapling unit 72, and the sheet folding unit 73 are included in the post-processing unit 70 different from the engine portion 30 has been described. However, the present disclosure is not limited to this configuration. For example, a configuration in which the double-sided transport mechanism 31 is provided as a double-sided unit different from the engine portion 30, and a configuration in which the sheet feeding mechanism 60 is provided as a double-sided unit different from the engine portion 30 are also included in the scope of the present disclosure. Further, a configuration in which the engine portion 30 includes at least one of the punching unit 71, the stapling unit 72, and the sheet folding unit 73 is also included in the scope of the present disclosure. Further, in addition to a configuration in which the punching unit 71, the stapling unit 72, and the sheet folding unit 73 are included in one post-processing unit 70, a configuration in which the punching unit 71, the stapling unit 72, and the sheet folding unit 73 can be mounted as a plurality of post-processing units in a distributed manner is also included within the scope of the present disclosure.

It should be construed that the present disclosure also includes any combination of the above-described plurality of configurations.

In addition to the embodiments described above, various modifications of the present disclosure are available. These modifications should not be construed as not belonging to the scope of the present disclosure. The invention according to the present disclosure should include the meaning equivalent to the scope of the claims and all modifications within the scope of the present disclosure.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:

a sheet feeding mechanism configured to feed one or more print sheets;

an image forming mechanism configured to:

form a first image on one surface of the one or more print sheets, allow the one or more print sheets to pass through the image forming mechanism, and form a second image on the other surface of the one or more print sheets when the one or more print sheets that have passed through the image forming mechanism are flipped back;

a double-sided transport mechanism configured to:

flip back the one or more print sheets on which the first image is formed, and guide the one or more print sheets to the image forming mechanism again;

a post-processing unit mounter on which a post-processing unit, that performs post-processing on a leading end or a trailing end of the one or more print sheets that are to be discharged, is mountable; and one or more controllers configured to control a print job, wherein when executing the print job, in which at least a sheet of the one or more print sheets is an index sheet and a post-processing function is set, the one or more controllers determine (i) whether the post-processing is to be performed, (ii) an order of the first image and the second image to be formed, and (iii) whether to flip back the one or more print sheets by using the double-sided transport mechanism according to a type of the post-processing performed by the mounted post-processing unit is to be on the leading end or the trailing end of the one or more print sheets.

2. The image forming apparatus according to claim 1, wherein when the index sheet is set in the sheet feeding mechanism in such a state in which an index portion is in the trailing end, and the post-processing unit is to perform the post-processing on the trailing end of the one or more print sheets, the one or more controllers:

form the first image and the second image on the one or more print sheets fed by the sheet feeding mechanism in a reverse order of pages, and discharge the one of more print sheets after the one or more print sheets are flipped back by the double-sided transport mechanism.

3. The image forming apparatus according to claim 2, further comprising:

a reverse discharge mechanism configured to flip back and discharge the one or more print sheets that have passed through the image forming mechanism, as necessary, wherein the one or more controllers determine the order of the first image and the second image to be formed and whether the index sheet is to be flipped back by the double-sided transport mechanism according to a presence or absence of the reverse discharge mechanism, and the type of the post-processing.

4. The image forming apparatus according to claim 2, wherein when the one or more print sheets include a print sheet other than the index sheet, the one or more controllers:

form the first image and the second image, in the reverse order of pages, on the one or more print sheets fed by the sheet feeding mechanism including the print sheet other than the index sheet, and flip back the one or more print sheets via the double-sided transport mechanism and then discharge the one or more print sheets.

5. The image forming apparatus according to claim 2, wherein, when the index sheet passes through the image forming mechanism:

when the index portion is in the trailing end, the one or more controllers allow the first image and the second image to be formed, and when the index portion is in the leading end, the one or more controllers do not allow the first image and the second image to be formed.

6. The image forming apparatus according to claim 4, wherein when the print sheet other than the index sheet is of a type that is not transportable by the double-sided transport mechanism, the one or more controllers determine that the print job is a job in which the post-processing is not possible, and the post-processing unit does not perform the post-processing.

7. The image forming apparatus according to claim 1, wherein the post-processing comprises punching.

8. An image forming method performed by one or more controllers that control a print job, the image forming method comprising:

feeding one or more print sheets by using a sheet feeding mechanism;

forming a first image on one surface of the one or more print sheets by using an image forming mechanism;

allowing the one or more print sheets to pass through the image forming mechanism;

flipping back the one or more print sheets on which the first image is formed, and determining whether to guide the one or more print sheets to the image forming mechanism again by using a double-sided transport mechanism;

when the one or more print sheets are guided to the image forming mechanism again, forming or not forming a second image on the other surface of the one or more print sheets by using the image forming mechanism;

performing post-processing on a leading end or a trailing end of the one or more print sheets by using a post-processing unit; and discharging the one or more print sheets, wherein when the print job, in which at least a sheet of the one or more print sheets is an index sheet and in which the post-processing is set, is executed, (i) an order of the first image and the second image to be formed and (ii) whether to flip back the one or more print sheets by the double-sided transport mechanism are determined according to a type of the post-processing performed by the post-processing unit is to be on the leading end or the trailing end of the one or more print sheets.

* * * * *